(12) United States Patent
Girouard

(10) Patent No.: US 6,901,952 B2
(45) Date of Patent: Jun. 7, 2005

(54) GAS FLOW REGULATION SYSTEM

(75) Inventor: Erick Girouard, Guelph (CA)

(73) Assignee: Teleflex GFI Control Systems L.P., Kitchener (CA)

(*) Notice: Subject to any disclaimer, the term of this patent is extended or adjusted under 35 U.S.C. 154(b) by 243 days.

(21) Appl. No.: 10/630,719

(22) Filed: Jul. 31, 2003

(65) Prior Publication Data

US 2004/0020537 A1 Feb. 5, 2004

Related U.S. Application Data

(63) Continuation of application No. 09/886,115, filed on Jun. 22, 2001, now abandoned.

(30) Foreign Application Priority Data

Jun. 23, 2000 (CA) .............................................. 2312122

(51) Int. Cl.[7] .............................................. G05D 16/06
(52) U.S. Cl. ............................. 137/505.12; 137/505.39; 137/614
(58) Field of Search ........................... 137/505, 505.12, 137/505.39, 505.41, 505.42, 505.43

(56) References Cited

U.S. PATENT DOCUMENTS

| | | | | |
|---|---|---|---|---|
| 567,764 A | * | 9/1896 | Dixon ............................ 222/3 |
| 1,883,690 A | * | 10/1932 | Gilgenberg ............. 137/505.12 |
| 3,323,535 A | * | 6/1967 | Klemm et al. .............. 137/110 |
| 4,802,507 A | * | 2/1989 | Willson ..................... 137/613 |
| 5,598,869 A | * | 2/1997 | Nelson ................. 137/505.11 |
| 5,694,975 A | * | 12/1997 | Eidsmore ................ 137/489.5 |
| 6,257,000 B1 | * | 7/2001 | Wang .......................... 62/48.1 |
| 6,360,546 B1 | * | 3/2002 | Wang et al. ................. 62/48.1 |

FOREIGN PATENT DOCUMENTS

| | | |
|---|---|---|
| BE | 387342 | 4/1932 |
| DE | 44 45 588 | 12/1994 |
| EP | 0 013 579 | 12/1982 |
| EP | 0 354 427 | 2/1990 |

OTHER PUBLICATIONS

Machine Design, Feb. 22, 1996, "RAV4 Uses Jet Pump in Divided Fuel Tank", p. 33.

"Compact, High–Flow Gas Regulators", Swagelok Company, 4 pp.

* cited by examiner

Primary Examiner—Stephen M. Hepperle

(57) ABSTRACT

A gas flow regulation module for use in a pressure vessel including a wall with an opening having a minimum opening diameter. The wall defines an interior space in the pressure vessel. The module includes a head portion, a neck portion, and a body portion. The body portion has a maximum diameter which is less than the minimum opening diameter, so that the body portion fits through the opening for positioning in the interior space. The gas flow regulation module includes a manual shut-off valve for controlling the flow of fluid through the module.

14 Claims, 14 Drawing Sheets

GAS FLOW REGULATION SYSTEM

This application is a continuation of prior application Ser. No. 09/886,115, filed Jun. 22, 2001, now abandoned.

FIELD OF THE INVENTION

The present invention relates to gas flow regulation systems for controlling the flow of gas, and more particularly relates to tank-mounted modules for controlling the flow of high pressure gaseous fuels such as compressed or liquified natural gas or hydrogen from a storage tank.

BACKGROUND OF THE INVENTION

It is becoming increasingly common to use so-called alternative fuels, such as propane or natural gas, in internal combustion engines or hydrogen in fuel cells. Often such engines are converted to use one or two or more sources of fuel, such as gasoline and natural gas. The operator has the ability to switch between sources depending on the availability and price of these fuels.

Many vehicles are manufactured to operate on gasoline only and are converted to run on two or more fuels. The vehicles are manufactured with storage tanks for gasoline, pumps for moving the gasoline from the tank to the engine, and carburetors or fuel injectors for introducing the fuel and the required amount of air for combustion into the engine.

Gaseous fuels such as propane, natural gas, and hydrogen must be stored in pressurized cylinders to compress the gas into a manageable volume. Increasing the pressure to the highest level that can safely be handled by the pressurized storage cylinder increases the amount of fuel that can be stored in that cylinder and extends the distance that the vehicle can be driven to its maximum. Typical storage cylinder pressures range from 2,000 to 5,000 psig.

Internal combustion engines cannot operate at such a high pressure, and the pressure of the gas must be reduced to a level at which the engine can be operated safely. Typically the pressure must be reduced to approximately 20 to 200 psig for use in internal combustion engines.

The pressure must also be regulated as it is reduced to ensure that the pressure of the fuel entering the engine is nearly constant even as the pressure in the storage cylinder is reduced. At the same time, the pressure regulation must permit as much gas as possible to be removed from the storage cylinder, and thus permit the pressure in the storage cylinder to fall to as close to the operating pressure as possible. A high pressure difference across the pressure regulator means that unused fuel remains in the storage cylinder and is unavailable to the engine.

Conventional pressure regulators having one or more stages over which the pressure is reduced are well-known and have long been used to reduce the pressure and regulate the flow of compressed gases. Conventional regulators typically use various arrangements of springs, diaphragms and machined parts to reduce pressures exerted by gases flowing through the regulators. One major concern is the risk of failure of a regulator, as failure can lead to a potentially dangerous release of the compressed gases into the atmosphere.

Another concern is the vulnerability of flow components (including pressure regulators) carrying alternate fuels to crash damage. It is desirable to take steps to protect such components to minimize the risk of failure thereof in an unsafe or catastrophic manner if the vehicle is involved in an accident. To this end, internally-mounted pressure regulators are known which are adapted for mounting on a pressure vessel with a portion thereof positioned inside the pressure vessel.

However, conventional internally-mounted regulator devices do not also include a number of features and/or components which are desirable, such as a manual shut-off valve and an in-tank solenoid valve assembly. Such features are not included in conventional internally-mounted regulator devices because the size of the opening in the pressure vessel wall so limits the size of the conventional internally-mounted regulator device that including these features has not been feasible for various reasons. For example, the size of the opening is limited because a relatively larger opening would tend to reduce the strength of the pressure vessel.

There is therefore a need for a gas flow regulation module which overcomes at least one of the deficiencies of conventional internally-mounted pressure regulator devices.

SUMMARY OF THE INVENTION

In a broad aspect of the present invention, there is provided a gas flow regulation module for use with a pressure vessel. The pressure vessel has a wall adapted to contain a gas under a storage pressure in an interior space defined by the wall. The pressure vessel also includes an opening in the wall with a minimum opening diameter. The gas flow regulation module has a head portion having an exterior side and an opposed interior side, a neck portion extending from the interior side of the head portion to an inner end thereof, and a body portion. The neck portion is adapted to be sealably secured in the opening in the wall. The body portion extends from the inner end of the neck portion so that, when the neck portion is secured in the opening, the body portion is positioned in the interior space.

The body portion has a maximum external diameter which is less than the minimum opening diameter, to permit the insertion of the body portion through the opening into the interior space. The body portion includes a base, an inlet port in fluid communication with the interior space of the pressure vessel when the body portion is positioned in the interior space, a flow passage extending from the inlet port to a first stage regulator, and a transfer passage in the base extending from the first stage regulator to a second stage regulator. The flow passage includes a valve seat positioned therein, between the first stage regulator and the inlet port, and the valve seat defines an orifice.

The gas flow regulation module also includes an outlet passage extending from the second stage regulator to an outlet port located in the head portion. The first stage regulator and the second stage regulator are adapted to reduce pressure exerted by the gas flowing therethrough from the storage pressure to an exit pressure. In addition, the gas flow regulation module includes a bore extending from a manual shut-off valve port in the head portion and through the neck portion and the base to the flow passage, the bore being in fluid communication with the flow passage, and a manual shut-off valve.

The manual shut-off valve includes a manual shut-off valve body sealably secured in the manual shut-off valve port, and a valve stem extending in the bore from a proximal end thereof operatively connected to the manual shut-off valve body to a distal end thereof. The distal end includes an engagement portion with a sealing surface thereon, the sealing surface being adapted for sealable engagement with the valve seat to prevent gas flow through the orifice. The valve stem is movable between a closed position, in which the engagement portion engages the valve seat to seal the orifice and thereby prevent gas flow through the flow passage to the first stage regulator, and an open position, in which the engagement portion is disengaged from the valve seat so that the orifice is unobstructed, to permit gas to flow through the flow passage to the first stage regulator. Accordingly, the flow of gas through the gas regulation module is controllable by the manual shut-off valve.

The manual shut-off valve can be used to isolate the first stage regulator and the second stage regulator from the interior space because the valve seat is located upstream from the first stage regulator.

In another aspect, the invention includes a solenoid valve assembly for controlling the flow of gas through the inlet port. The solenoid valve assembly includes a valve body adapted for attachment to the base, the valve body including the inlet port and a valve body segment of the flow passage extending from the inlet port to the valve seat. The solenoid valve assembly also includes a solenoid valve seat located in the valve body segment defining an orifice, and a solenoid valve. The solenoid valve is mounted to an inner end of the valve body and includes a seal for engagement with the solenoid valve seat, to sealably close the orifice, a biasing means to bias the seal towards the solenoid valve seat to close the orifice, a secondary piston connected to the seal, and a coil for causing movement of the secondary piston so that the seal disengages from the solenoid valve seat when the coil is actuated.

In yet another aspect, the invention provides a gas flow regulation system including a pressure vessel and a gas flow regulation module for use with the pressure vessel.

The pressure vessel has a wall adapted to contain a gas under a storage pressure in an interior space defined by the wall, and the wall has an opening therein. The opening has a minimum opening diameter.

The gas flow regulation module has a head portion having an exterior side and an opposed interior side, a neck portion extending from the interior side of the head portion to an inner end thereof and a body portion. The neck portion is adapted to be sealably secured in the opening in the wall. The body portion extends from the inner end of the neck portion so that, when the neck portion is secured in the opening, the body portion is positioned in the interior space.

The body portion has a maximum external diameter which is less than the minimum opening diameter, to permit the insertion of the body portion through the opening into the interior space. The body portion includes a base, an inlet port in fluid communication with the interior space of the pressure vessel when the body portion is positioned in the interior space, a flow passage extending from the inlet port to a first stage regulator, and a transfer passage in the base extending from the first stage regulator to a second stage regulator. The flow passage includes a valve seat positioned therein, between the first stage regulator and the inlet port, and the valve seat defines an orifice.

The gas flow regulation module also includes an outlet passage extending from the second stage regulator to an outlet port located in the head portion. The first stage regulator and the second stage regulator are adapted to reduce pressure exerted by the gas flowing therethrough from the storage pressure to an exit pressure. In addition, the gas flow regulation module includes a bore extending from a manual shut-off valve port in the head portion and through the neck portion and the base to the flow passage, the bore being in fluid communication with the flow passage, and a manual shut-off valve.

The manual shut-off valve includes a manual shut-off valve body sealably secured in the manual shut-off valve port, and a valve stem extending in the bore from a proximal end thereof operatively connected to the manual shut-off valve body to a distal end thereof. The distal end includes an engagement portion with a sealing surface thereon, the sealing surface being adapted for sealable engagement with the valve seat to prevent gas flow through the orifice. The valve stem is movable between a closed position, in which the engagement portion engages the valve seat to seal the orifice and thereby prevent gas flow through the flow passage to the first stage regulator, and an open position, in which the engagement portion is disengaged from the valve seat so that the orifice is unobstructed, to permit gas to flow through the flow passage to the first stage regulator. Accordingly, the flow of gas through the gas regulation module is controllable by the manual shut-off valve.

In a further aspect, the gas flow regulation system additionally includes a solenoid valve assembly for controlling the flow of gas through the inlet port. The solenoid valve assembly includes a valve body adapted for attachment to the base, the valve body including the inlet port and a valve body segment of the flow passage extending from the inlet port to the valve seat. The solenoid valve assembly also includes a solenoid valve seat located in the valve body segment defining an orifice, and a solenoid valve. The solenoid valve is mounted to an inner end of the valve body and includes a seal for engagement with the solenoid valve seat, to sealably close the orifice, a biasing means to bias the seal towards the solenoid valve seat to close the orifice, a secondary piston connected to the seal, and a coil for causing movement of the secondary piston so that the seal disengages from the solenoid valve seat when the coil is actuated.

BRIEF DESCRIPTION OF THE DRAWINGS

The invention will be better understood with reference to the drawings in which.

DETAILED DESCRIPTION OF THE PREFERRED EMBODIMENT(S)

Figure 1:
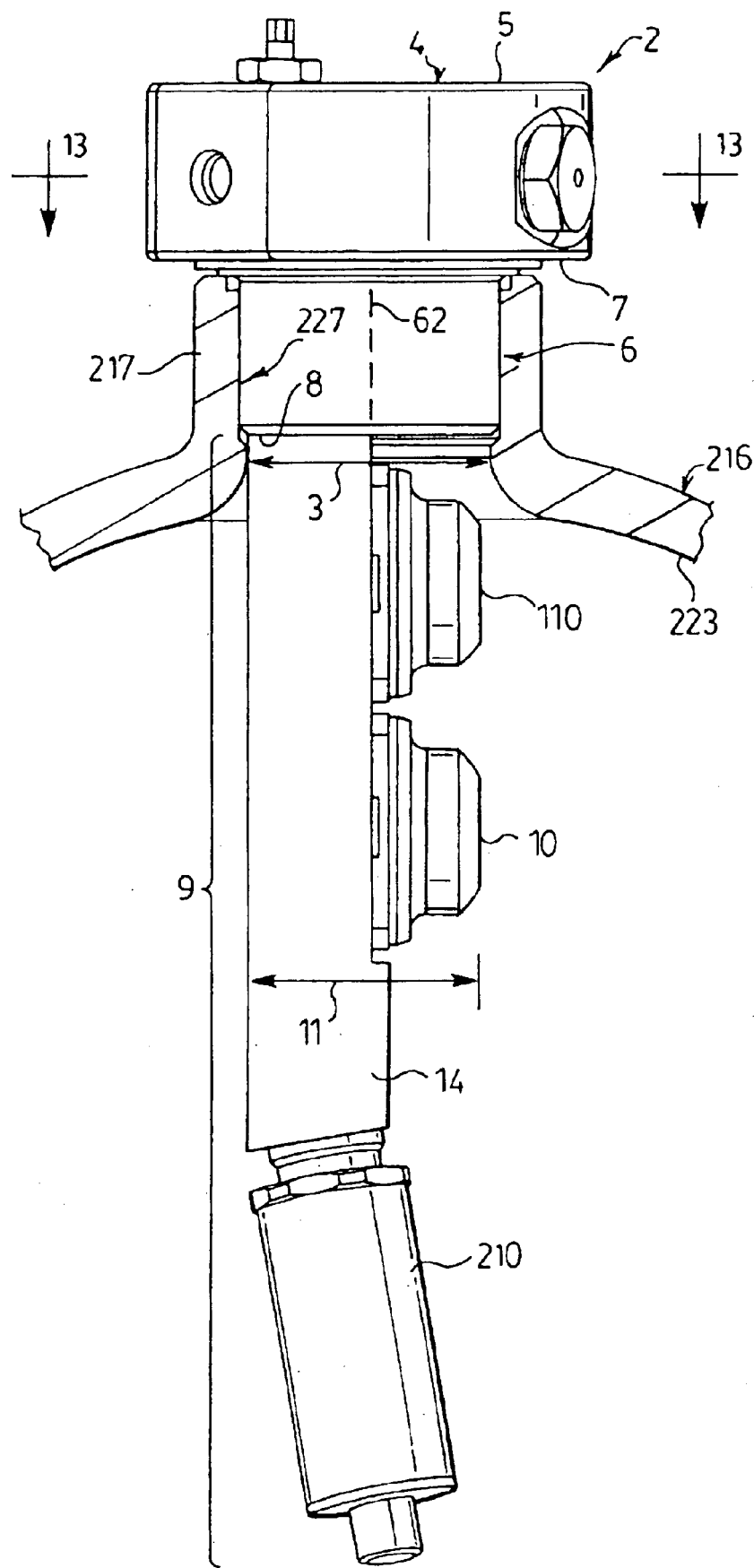
FIG. 1 is a side view of a preferred embodiment of the gas flow regulation module, mounted on a pressure vessel.

Reference is first made to FIG. 1 to describe a preferred embodiment of a gas flow regulation module indicated generally by the numeral 2 in accordance with the invention. The gas flow regulation module is for use with a pressure vessel 216 which has a wall 223 adapted to contain a gas (not shown) under a storage pressure in an interior space 219 defined by the wall 223. The pressure vessel 216 also has an opening 227 in the wall 223, and the opening 227 has a minimum opening diameter 230. The gas flow regulation module 2 preferably includes a head portion 4, a neck portion 6, and a body portion 9. As can be seen in FIG. 1, the head portion 4 has an exterior side 5 and an opposed interior side 7, and the neck portion 6 extends from the interior side 7 to an inner end 8 thereof. The neck portion 6 is adapted to be sealably secured in the opening 227. FIG. 1 also shows that the body portion 9 extends from the inner end 8 of the neck portion 6 so that, when the neck portion 6 is secured in the opening 227, the body portion 9 is positioned in the interior space 219. It can be seen in FIG. 1 that the body portion 9 has a maximum external diameter 11 which is less than the minimum opening diameter 3, so that the body portion 9 can be inserted through the opening 227 into the interior space 219, to position the body portion 9 in the interior space 219.

Figure 5:
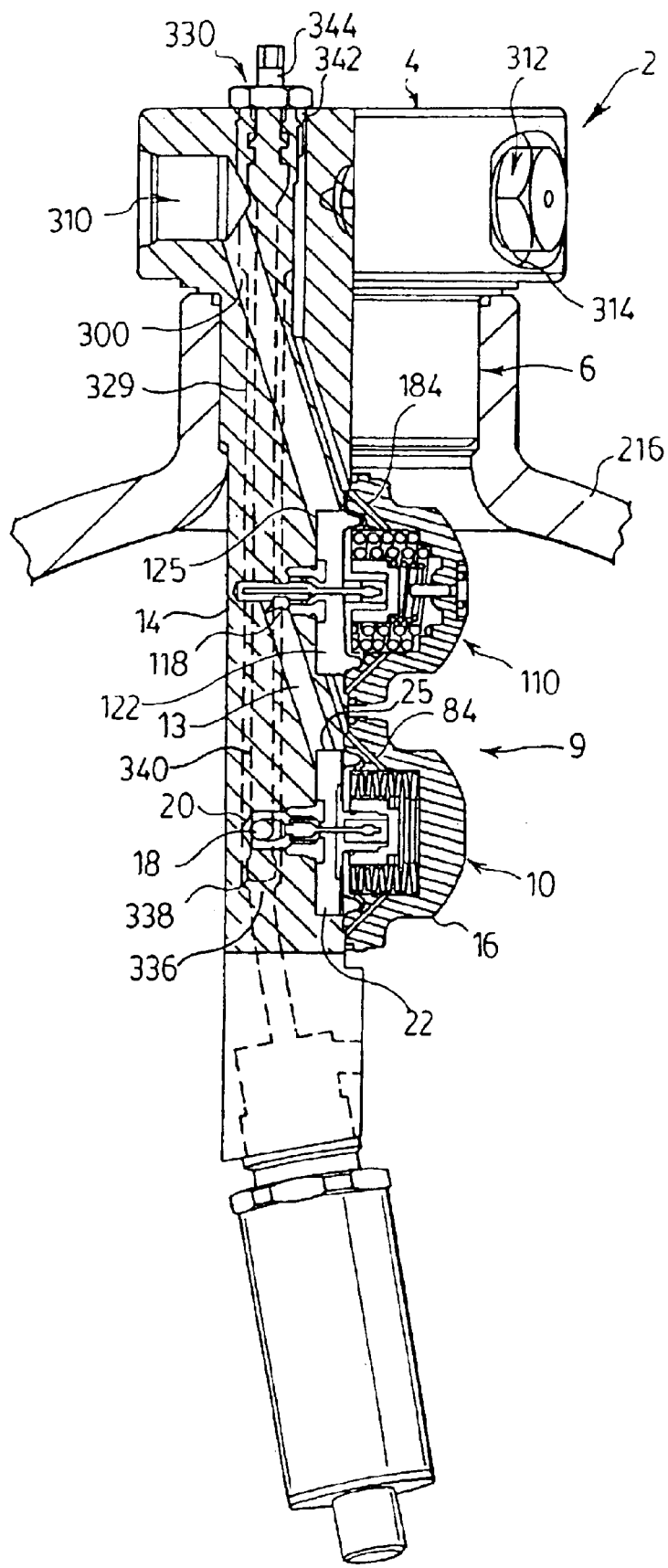
FIG. 5 is a partial cross-section of the gas flow regulation module of FIG. 1, drawn at a smaller scale.
Figure 6:
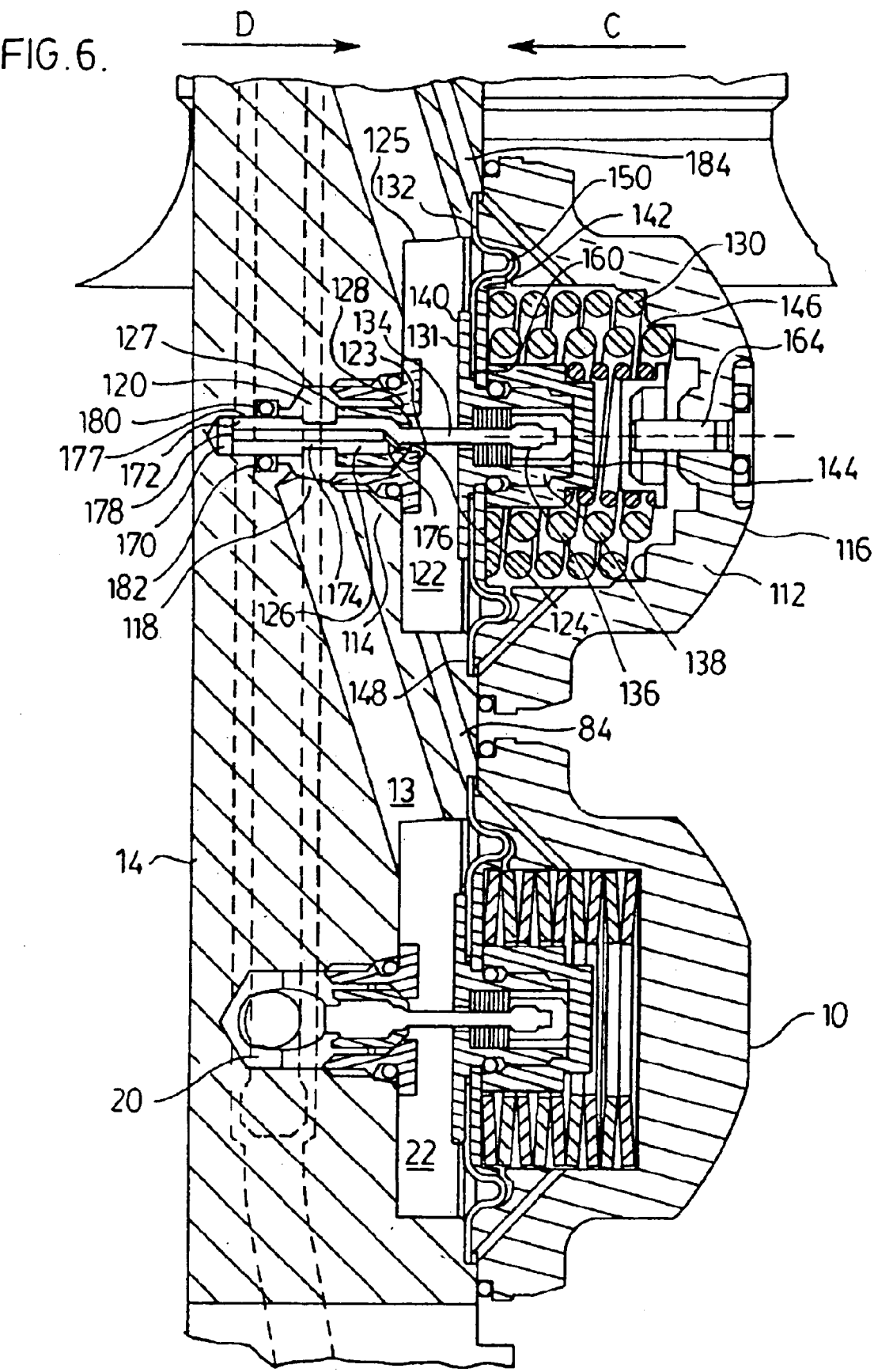
FIG. 6 is a cross-section of the first stage regulator and a second stage regulator of the gas flow regulation module of FIG. 1, drawn at a larger scale.

In its preferred embodiment, the body portion 9 has a base 14 and an inlet port 220 (FIGS. 8–12) in fluid communication with the interior space 219 of the pressure vessel 216 when the body portion 9 is positioned in the interior space 219. The body portion 9 also includes a flow passage 224 extending from the inlet port 220 to a first stage regulator 10 (FIGS. 7–12). As can be seen in FIGS. 5 and 6, the preferred embodiment includes a transfer passage 13 which is located in the base 14 and extends from the first stage regulator 10 to a second stage regulator 110. In addition, the flow passage 224 includes a valve seat 335 (FIGS. 7 and 12) positioned therein, between the first stage regulator 10 and the inlet port 220. An orifice 336 is defined by the valve seat 335, the purpose of which will be described.

The preferred embodiment of the gas flow regulation module 2 also includes an outlet passage 300 extending from the second stage regulator 110 to an outlet port 310 located in the head portion 4 (FIG. 5). The first stage regulator 10 and the second stage regulator 110 are adapted to reduce pressure exerted by the gas flowing therethrough from the storage pressure to an exit pressure, as will be described.

Figure 7:
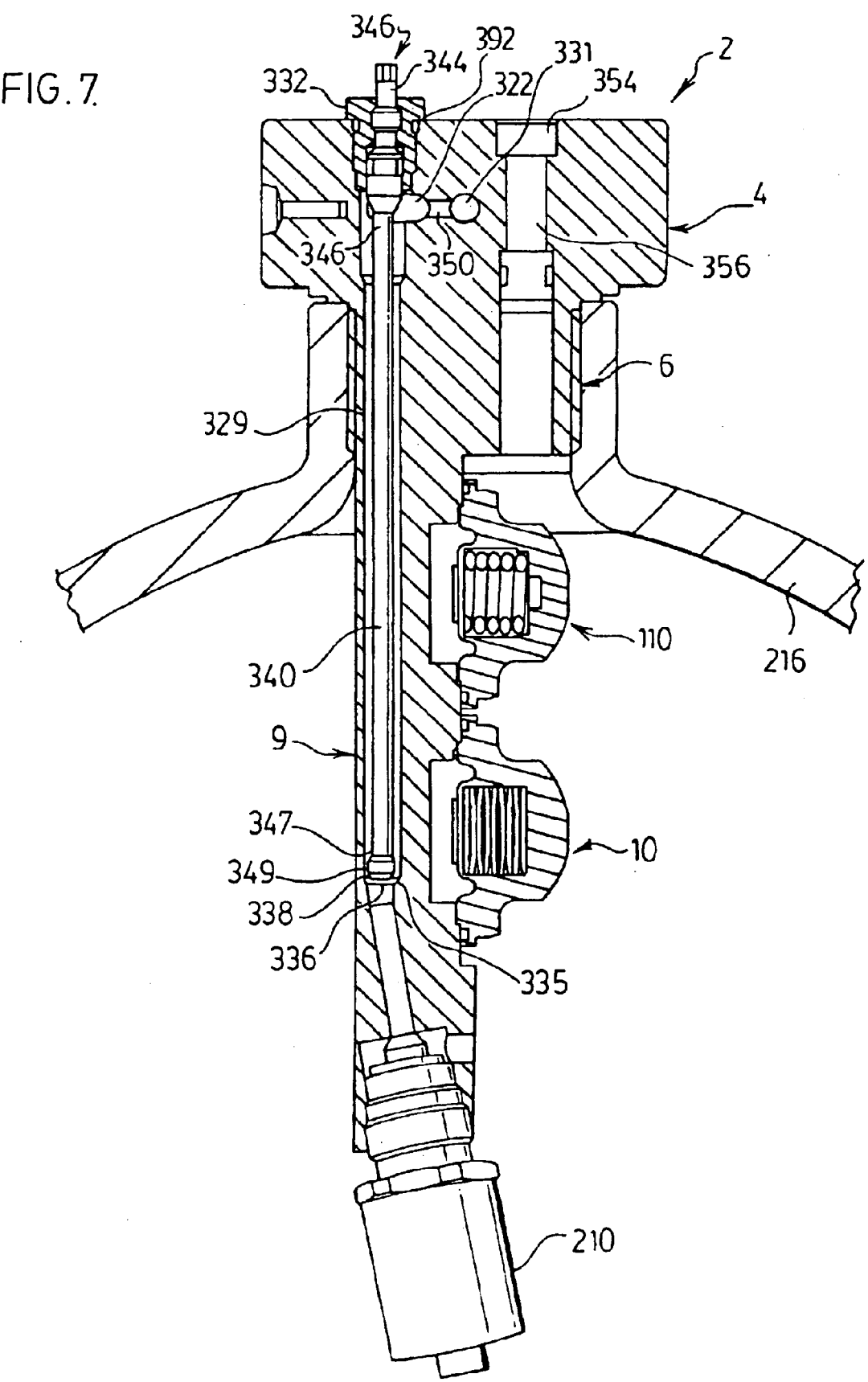
FIG. 7 is a cross-section of the gas flow regulation module of FIG. 1, drawn at a smaller scale.
Figure 12:
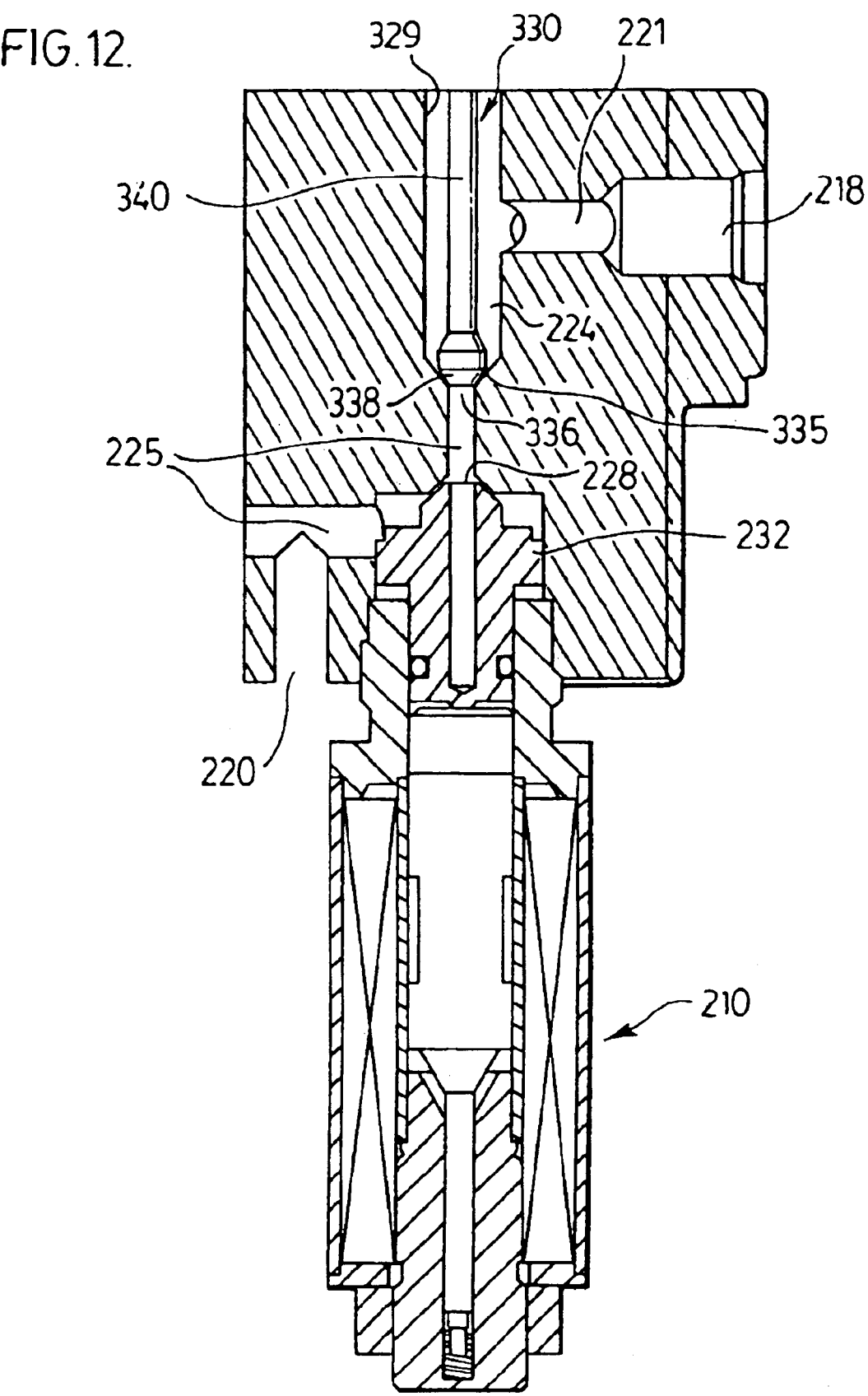
FIG. 12 is a cross-section showing a portion of a manual shut-off valve blocking flow between an inlet port and the first stage regulator.

Preferably, the gas flow regulation module 2 also includes a bore 329 extending from a manual shut-off valve port 342 (FIG. 5) in the head portion 4 and through the neck portion 6 and the base 14 to the flow passage 224 (FIGS. 5, 7, 12). The bore 329 is in fluid communication with the flow passage 224 (FIG. 12).

As can be seen in FIGS. 5, 7, and 12, the preferred embodiment of the gas flow regulation module 2 also includes a manual shut-off valve 330 which has a manual shut-off valve body 332 (FIG. 7) and a valve stem 340. The manual shut-off valve body 332 is sealably secured in the manual shut-off valve port 342. The valve stem 340 extends in the bore 329 from a proximal end 346 thereof operatively connected to the manual shut-off valve body 332 to a distal end 347 (FIG. 7). The distal end 347 includes an engagement portion 349 with a sealing surface 338 thereon (FIG. 7). The sealing surface 338 is adapted for sealable engagement with the valve seat 335 to prevent gas exiting from the interior space 219 from flowing through the orifice 336, thereby isolating the first stage and second stage regulators 10, 110 from such gas. The valve stem 340 is movable between a closed position (FIG. 12), in which the engagement portion 349 engages the valve seat 335 to seal the orifice 336 and thereby prevent the flow of gas through the flow passage 224 to the first stage regulator 10, and an open position (FIG. 7). When the orifice 336 is closed, the first stage and second stage regulators 10, 110 are isolated from the interior space 219 of the pressure vessel 216. In the open position, the engagement portion 349 is disengaged from the valve seat 335 so that the orifice 336 is unobstructed, permitting gas to flow through the flow passage 224 to the first stage regulator 10. Accordingly, in the preferred embodiment of the gas flow regulation module 2, the flow of gas exiting the pressure vessel 216 through the module 2 is controllable by the manual shut-off valve 330.

It can be seen in FIGS. 5 and 12 that the valve seat 335 is located upstream from the first stage regulator 10, i.e., upstream with respect to gas exiting the pressure vessel 216 via the gas flow regulation module 2. The location of the valve seat 335 in the flow passage 224 is a significant safety feature of the invention because such location facilitates isolation of the first stage and second stage regulators 10, 110 from the gas in the interior space 219.

Preferably, the manual shut-off valve 330 includes an actuator 344 extending from the manual shut-off valve body 332 and operably connected to the valve stem 340, as can be seen in FIGS. 5 and 7. The actuator 344 is for effecting movement of the valve stem 340 between the open and closed positions. A user (not shown) can quickly and easily cause the valve stem 340 to move between the open and closed positions by manipulation of the actuator 344.

Figure 11:
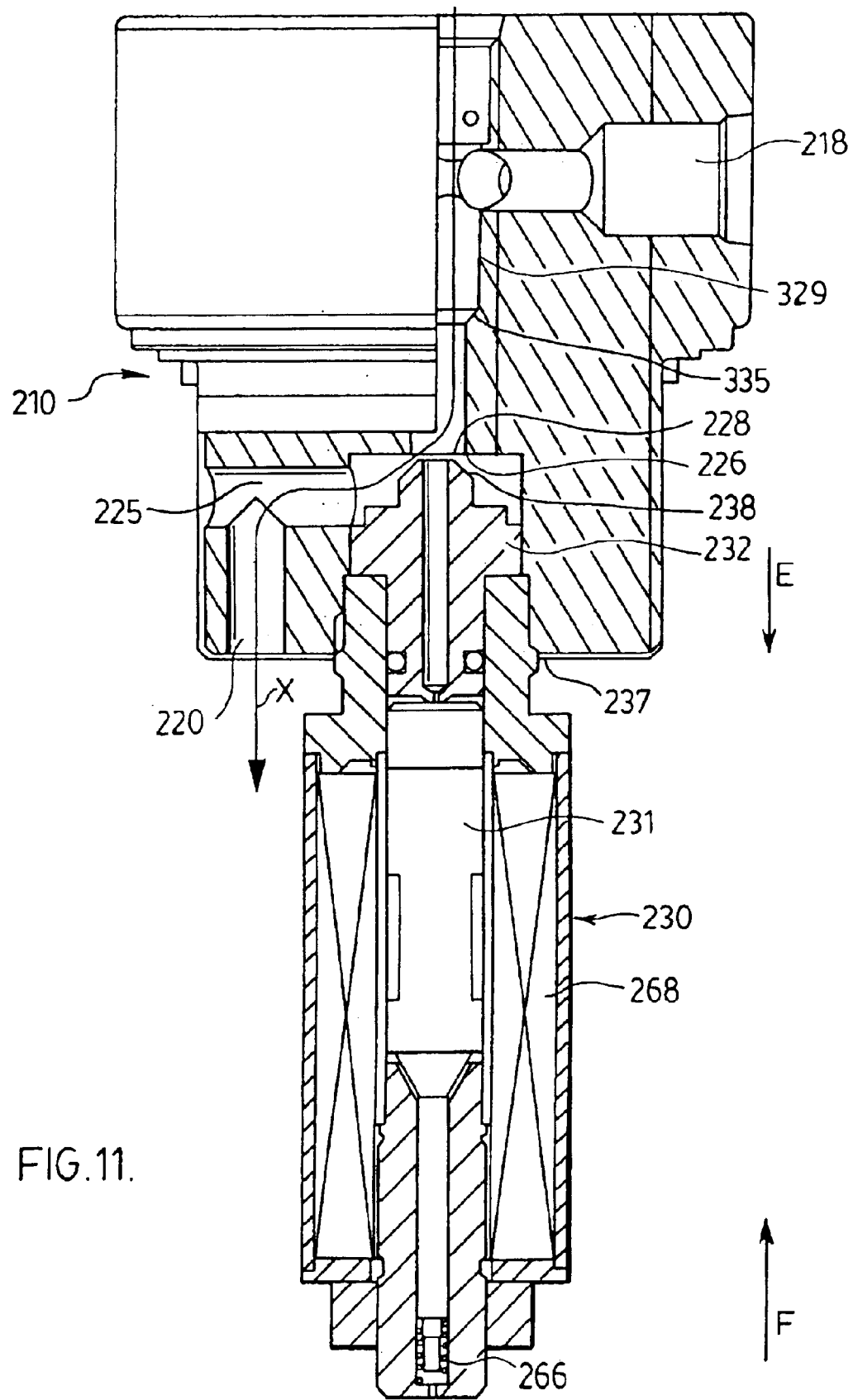
FIG. 11 is a cross-section showing a flow path taken through the solenoid valve assembly of FIG. 11 during filling of the pressure vessel.

Preferably, the flow passage 224 comprises a first segment 225 extending from the inlet port 220 to the orifice 336 and a second segment 221 extending from the orifice 336 to the first stage regulator 10 (FIGS. 11 and 12). (In FIG. 12, the first segment 225 is shown as being blocked by a secondary piston 232 for illustrative purposes.) In the preferred embodiment, the gas flow regulation module 2 also includes a fill port 331 located in the head portion 4, and a fill passage 350 extending from the fill port 331 to the bore 329 (FIG. 7). The fill port 331 and the fill passage 350 are adapted to permit gas under a fill pressure which exceeds the storage pressure (i.e., the pressure which the gas then remaining in the interior space is under) to move through the fill passage 350 to the bore 329, and subsequently through the orifice 336 to the first segment 225 of the flow passage 224. The incoming gas moves from the first segment 225 through the inlet port 220 and into the interior space 219 (FIGS. 5, 7 and 12), as will be described. Arrow "X" in FIG. 11 schematically shows a flow path of gas flowing into the interior space 219.

In the preferred embodiment, and as can be seen in FIGS. 8–12, the body portion 9 of the gas flow regulation module 2 additionally includes a solenoid valve assembly 210 for controlling the flow of gas through the inlet 220. Preferably, the solenoid valve assembly 210 includes a valve body 212 which includes the inlet port 220 and the first segment (or valve body segment) 225 of the flow passage 224 (FIG. 12). The solenoid valve assembly 210 also includes a solenoid valve seat 226 (FIG. 10) located in the first segment (or valve body segment) 225 defining an orifice 228 (FIG. 11). In addition, the solenoid valve assembly 210 includes a solenoid valve 230 mounted to an inner end 237 of the valve body 212. The solenoid valve 230 includes a seal 238 for engaging with the solenoid valve seat 226 to sealably close the orifice 228, a biasing means 266 to bias the seal 238 towards the solenoid valve seat 226, and the secondary piston 232 to which the seal 238 is connected. In addition, the solenoid valve 230 includes a coil 268, for causing movement of the secondary piston 232 upon actuation of the coil 268, so that the seal 238 becomes disengaged from the solenoid valve seat 226 following actuation of the coil 268, as will be described (FIGS. 8–11).

In the preferred embodiment, the solenoid valve 230 is also adapted to open upon gas at the fill pressure entering into the first segment 225. Upon gas at the fill pressure entering the first segment 225, such gas pushes the seal 238 open and thereby forces the seal 238 to disengage from the solenoid valve seat 226, so that gas under the fill pressure can pass through the first segment 225 in the inlet port 220 and subsequently into the interior space 219. The gas causes the solenoid valve 230 to open if the force applied by the gas in the direction shown by arrow "E" in FIG. 11 if greater than the force provided by the spring 266 and directed in the opposite direction (shown by arrow "F" in FIG. 11), as will be described. When the solenoid valve 230 is open and the pressure vessel 216 is being filled, the path of gas flowing through the orifice 228 and the inlet port 220 and to the interior space 219 is shown by arrow "X" in FIG. 11.

Figure 13:
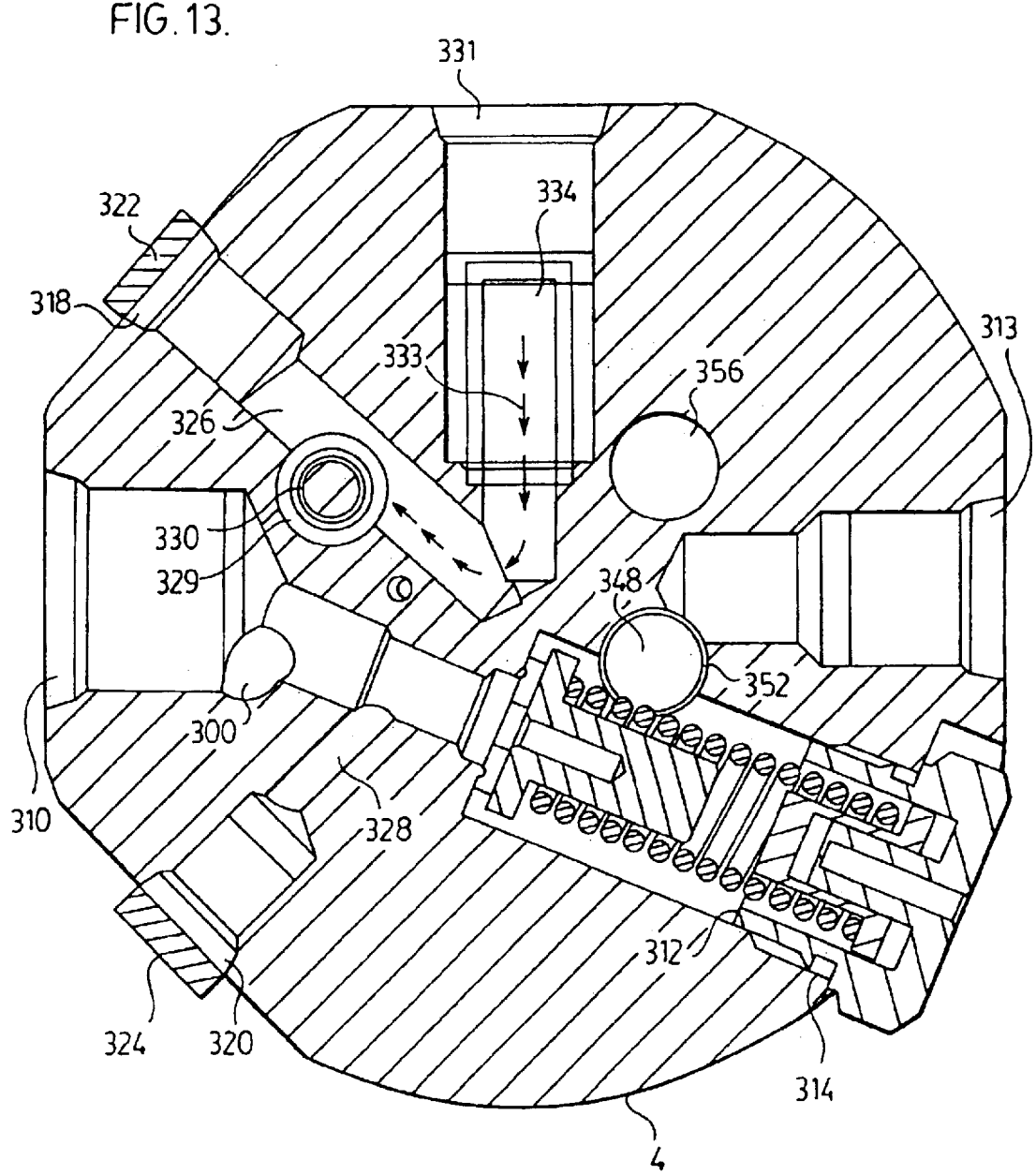
FIG. 13 is a cross-section of a part of the head portion of the gas flow regulation module of FIG. 1, drawn at a larger scale.
Figure 14:
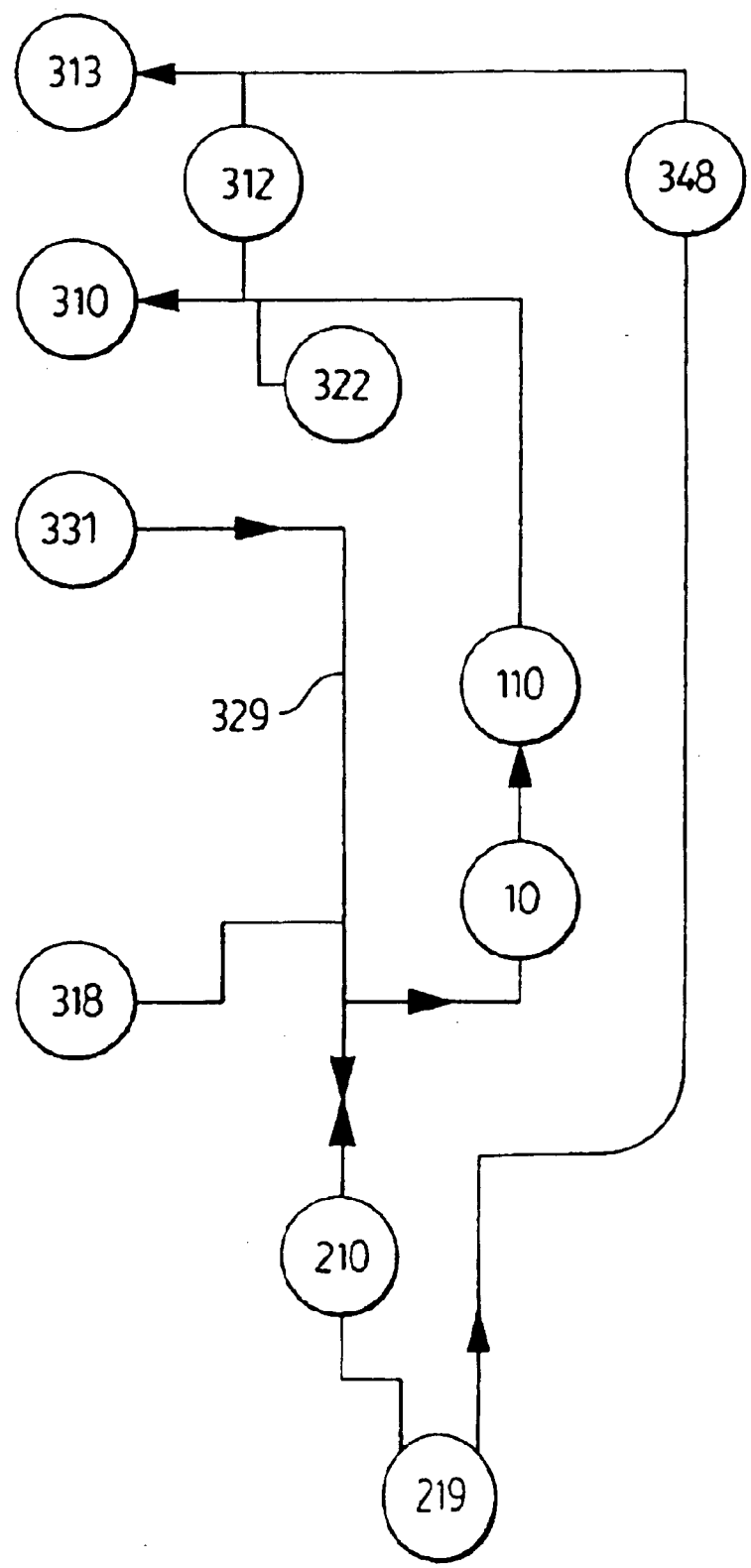
FIG. 14 is a schematic illustration of the process flow paths provided in the gas flow regulation module of FIG. 1.

Preferably, the gas flow regulation module 2 additionally includes a filter assembly 334 positioned in the fill passage 350 to filter incoming gas (FIG. 13). It is also preferable that the gas flow regulation module 2 includes a pressure relief valve 312 in fluid communication with the outlet passage 300 and positioned to vent to the atmosphere via a relief outlet connection 313 positioned in the head portion 4 (FIG. 13).

Figure 3:
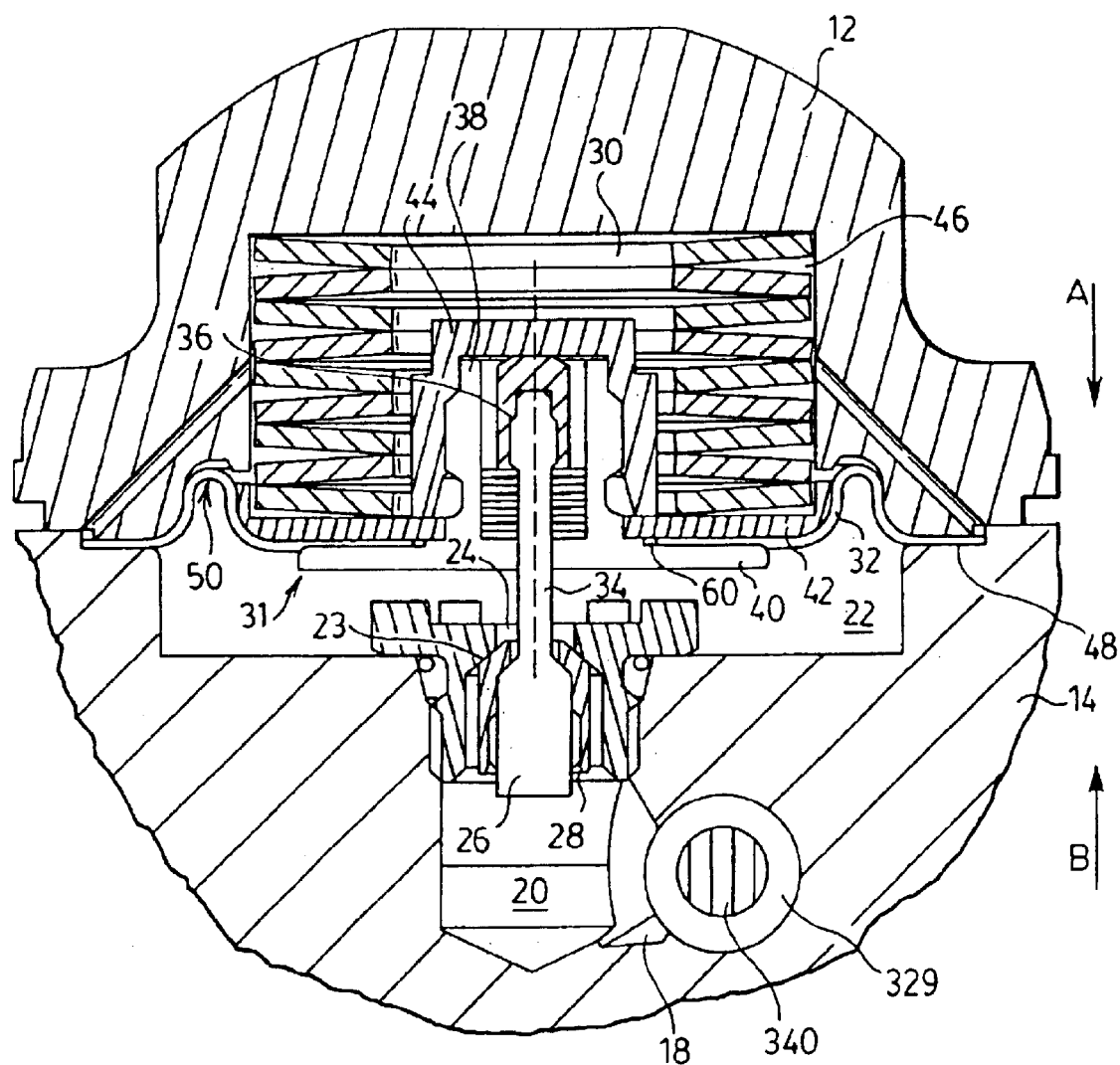
FIG. 3 is a cross-section of a first stage regulator of the gas flow regulation module of FIG. 1, drawn at a larger scale.
Figure 4:
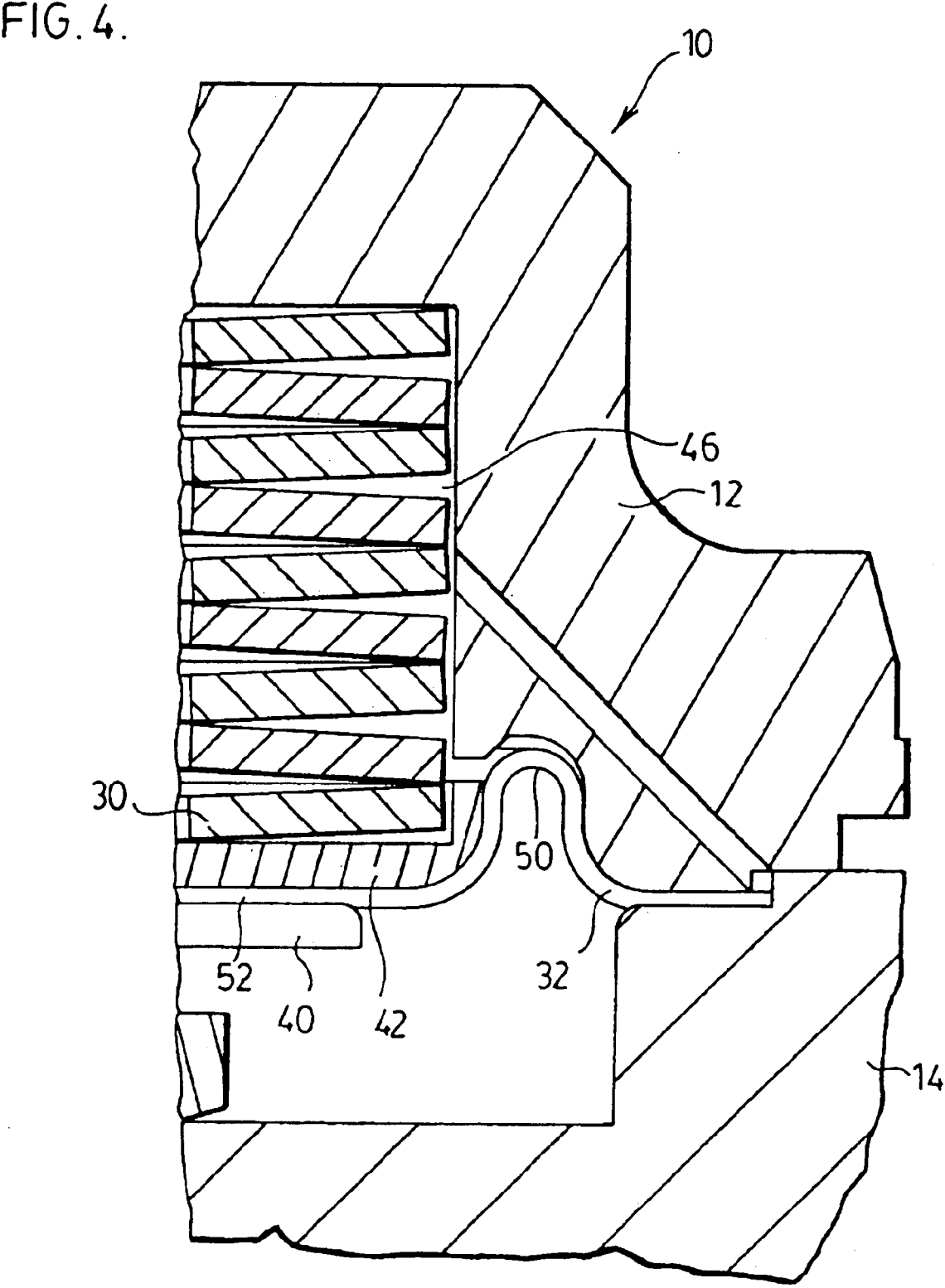
FIG. 4 is a partial cut-away cross-section of the first stage pressure regulator of FIG. 3, drawn at a larger scale.

Referring to FIGS. 3 and 4, the first stage pressure regulator 10 includes a spring tower 12 mounted to the base 14. The base 14 includes an inlet port 18 in fluid communication with a pintle chamber 20. The pintle chamber 20 is configured to be in fluid communication with an output chamber 22, as will be described. The pintle chamber 20 and the output chamber 22 meet at a valve seat 23 defining an orifice 24. A valve pintle 26 is disposed within the pintle chamber 20 and includes a sealing surface 28 to press against the valve seat 23 and thereby close the orifice 24. The output chamber 22 is in fluid communication with an outlet port 25 formed within the base 14 (FIG. 5).

The valve pintle 26 is movable to open and close the orifice 24 in response to the combined action of a spring 30 and a movable pressure boundary member 31 (FIG. 3). (The valve pintle 26 is shown in the closed position in FIG. 3.) The spring 30 is retained within a spring chamber 46 formed in the spring tower 12 to exert a force on the movable pressure boundary member 31 in the direction of arrow "A" in FIG. 3. The spring 30 can be any suitable spring (or springs), as would be known by those skilled in the art, such as, for example, a coil spring, spring washers, or elastomeric-type springs. As can be seen in FIG. 3, the force exerted by the spring 30 tends to move the valve pintle 26 towards an open position wherein the sealing surface 28 is unseated from a valve seat 23, thereby opening the orifice 24 into fluid communication with the output chamber 22. Gas pressure in the pintle chamber 20 and the output chamber 22 acts against the movable pressure boundary member 31, in the direction of arrow "B" in FIG. 3, thereby opposing the force exerted by the spring 30 and tending to move the valve pintle 26 towards a closed position. When the pintle 26 is in the closed position, the sealing surface 28 is pressed against the valve seat 23, thereby closing the orifice 24, as shown in FIG. 3. A pintle stem 34 extends from the valve pintle 26, terminating in a pintle nut 36. The pintle nut 36 is mounted within a central boss 38, and the central boss 38 extends through the centre of the movable pressure boundary 31. The spring 30 is fitted over a locking ring 44, and is supported on the movable pressure boundary member 31.

In the preferred embodiment, the movable pressure boundary member 31 is a diaphragm assembly comprising a diaphragm 32, a first diaphragm plate 40 and a diaphragm support plate 42. The diaphragm 32 is mounted on the first diaphragm plate 40 disposed on one side of the diaphragm 32 and extending outwardly from the central boss 38. The diaphragm 32 further includes a bore 60 therethrough which receives the central boss 38. As shown in FIG. 3, the locking ring 44 fits over the central boss 38. The diaphragm 32 is pinched between the first diaphragm plate 40 and the diaphragm support plate 42, and the first diaphragm plate 40 and the diaphragm support plate 42 are squeezed together (i.e., to pinch the diaphragm 32 between them) by the locking ring 44 (FIG. 3). A groove 48 is formed between the spring tower 12 and the base 14 to receive a portion of the diaphragm 32 which is pressed between the base 14 and the spring housing 12, thereby securing the diaphragm 32 to the base 14. Accordingly, the diaphragm 32 seals the output chamber 22 from the spring chamber 46, thereby isolating the output chamber 22 from the spring chamber 46. FIG. 5 shows that the spring chamber 46 is in fluid communication with an output chamber 122 of the second stage regulator through a vent passage 84, as will be described.

In the preferred embodiment, the diaphragm 32 includes a rolling convolution 50 (FIG. 4) extending from a section 52 of the diaphragm 32 characterized by a flat profile, to provide a modification in the behaviour of the diaphragm 32. Specifically, this design is intended to cause the diaphragm 32 to be normally in tension (i.e., not in shear or compression). Thus, as the movable pressure boundary 31 moves in the directions of arrows "A" and "B" (FIG. 3) in response to variations in pressure of gas flowing through the first stage regulator 10, the diaphragm 32 is not stretched or buckled, so that hysteresis effects are largely eliminated.

The output port 25 opens into the transfer passage 13 which is in fluid communication with an inlet port 118 of the second stage regulator 110, as illustrated in FIGS. 5 and 6. The pressure regulator 110 includes a spring housing 112 mounted to the base 14. The inlet port 118 is in fluid communication with a pintle chamber 120, which in turn is configured to be in fluid communication with an output chamber 122 in certain circumstances, as will be described. The pintle chamber 120 and the output chamber 122 meet at a valve seat 123 defining an orifice 124. A valve pintle 126 is disposed within the pintle chamber 120 and includes a sealing member 127 with a sealing surface 128 adapted for sealing engagement with valve seat 123, to close the orifice 124. As can be seen in FIG. 6, the output chamber 122 is in fluid communication with an output port 125 formed within the base 14.

The valve pintle 126 is movable between a closed position, in which the orifice 124 is closed (as shown in FIG. 6), and an open position in which the orifice 124 is unobstructed, in response to the combined action of a spring 130 and a diaphragm 132. The spring 130 is provided within the spring housing 112 to exert a force substantially in the direction of arrow "C" (FIG. 6) which tends to move the valve pintle 126 towards the open position, in which the sealing surface 128 is unseated from the valve seat 123, thereby opening the orifice 124 so that it is in fluid communication with the output chamber 122. Gas pressure in the pintle chamber 120 and the output chamber 122 acts against the movable pressure boundary member 131 substantially in the direction of arrow "D" (FIG. 6), thereby opposing forces exerted by the spring 130 and tending to move the valve pintle 126 towards a closed position. In the closed position, as shown in FIG. 6, the sealing surface 128 is pressed against the valve seat 123, thereby closing the orifice 124. A pintle stem 134 extends from the valve pintle 126, terminating in a pintle nut 136. The pintle nut 136 is mounted within a central boss 138. The central boss 138 extends through the centre of the movable pressure boundary member 131. The spring 134 fits over a locking ring 144, and is supported on the movable pressure boundary member 131.

Preferably, the second stage pressure regulator 110 is a balanced regulator with features provided to mitigate pressure imbalances which are attributable to unsteady state conditions, such as source pressure variability in the pintle chamber 120. The regulator 110 also includes a balancing chamber 170 sealed from the pintle chamber 120. Also, the valve pintle 126 includes a balancing stem 172 extending from the sealing member 127 into the balancing chamber 170. The valve pintle 126 further includes a throughbore 174 extending between ports 176 and 178 provided in the valve pintle 126. The port 176 opens into the output chamber 122, and the port 178 opens into the balancing chamber 170. The balancing chamber 170 is sealed from the pintle chamber 120 by a sealing member 180, such as an O-ring, which is carried within a groove 182 provided on an internal surface 177 of the balancing chamber 170. By virtue of this arrangement, the balancing chamber 170 is in direct communication with the output chamber 122. To mitigate the effects of pressure variability within the pintle chamber 120 on the regulation of pressure by the combined action of the movable pressure boundary member 131 and the valve pintle 126, the cross-sectional area of the balancing stem 172 is made substantially the same as the seating area of the sealing surface 128. This substantially reduces the impact of pressure variations in the pintle chamber 120 on the regulatory function of the movable pressure boundary member 131 and the valve pintle 126.

The spring 130 is retained within a spring chamber 146 formed within the spring housing 112. As would be known by those skilled in the art, the spring 130 can comprise any suitable resilient member or members, such as, for example, coil springs, spring washers, or elastomeric-type springs.

In the preferred embodiment, the movable pressure boundary member 131 is a diaphragm assembly comprising the diaphragm 132, a first diaphragm plate 140, and the diaphragm support plate 142. The diaphragm 132 further includes a throughbore 160 which receives the central boss 138. The diaphragm 132 is mounted on the first diaphragm plate 140 disposed on one side of the diaphragm 132 and extending outwardly from the central boss 138. As shown in FIG. 6, the locking ring 144 fits over the central boss 138. The diaphragm 132 is pinched between the first diaphragm plate 140 and the diaphragm support plate 142, and the first diaphragm plate 140 and the diaphragm support plate 142 are squeezed together (i.e., to pinch the diaphragm 132 between them) by the locking ring 144 (FIG. 6). A groove 148 is formed between the base 14 and the spring housing 112 to receive a portion of the diaphragm 132 which is pressed between the base 14 and the spring housing 112, thereby securing the diaphragm 132 to the base 14. The diaphragm 132 seals the output chamber 122 from the spring chamber 146. FIG. 5 shows that the spring chamber 146 is in fluid communication with a vent passage 184, as will be described. In the preferred embodiment, diaphragm 132 includes a rolling convolution 150, which functions in the same manner as the rolling convolution 50 in the first stage regulator 10, as described above.

In the preferred embodiment an adjustment device, such as a screw 164, is included in the second stage regulator 110 and extends through the spring housing 112 to adjust compression of associated spring 130, thereby enabling flow control characteristics of the valve pintle 126.

Figure 2:
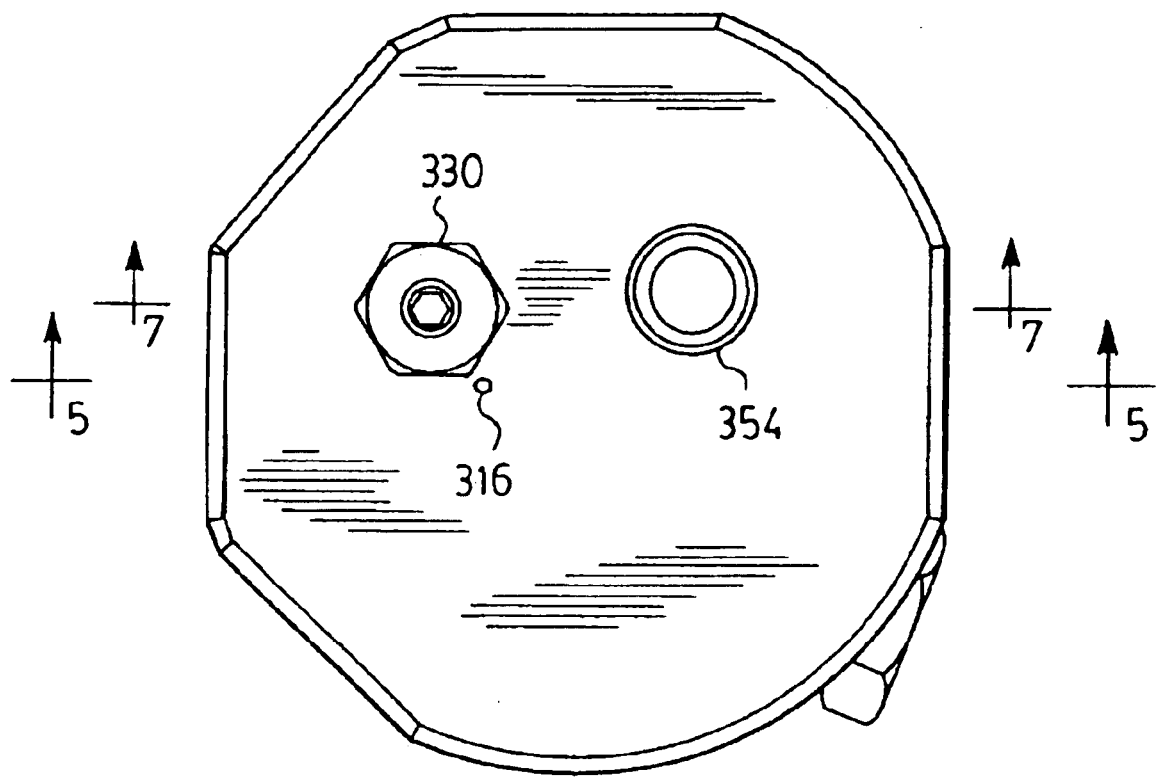
FIG. 2 is a top view of the gas flow regulation module of FIG. 1, showing an exterior side of a head portion thereof, drawn at a larger scale.

As shown in FIG. 5, the spring chamber 46 of the first stage regulator 10 vents through the vent passage 84 to the output chamber 122 of the second stage regulator 110. Similarly, the spring chamber 146 of the second stage regulator 110 vents via the vent passage 184 to the atmosphere via a port 316 (FIG. 2) formed within the head portion 4.

In the preferred embodiment, the gas flow regulation module 2 includes a pressure relief device 312 connected to the outlet passage 300 and installed in a port 314 in the head portion 4, as shown in FIG. 13. The pressure relief device 312 vents to the atmosphere via a relief outlet connection 313 (FIG. 13).

As shown in FIG. 13, sensor ports 318 and 320 preferably are included in the head portion 4 for receiving high pressure and low pressure sensors 322 and 324 respectively. High pressure sensor 322 measures the pressure of gas entering the inlet port 18 of the first stage regulator 10. Also, low pressure sensor 324 senses pressure within the outlet passage 300 and, therefore, measures gas pressure leaving the second stage regulator 110.

Figure 8:
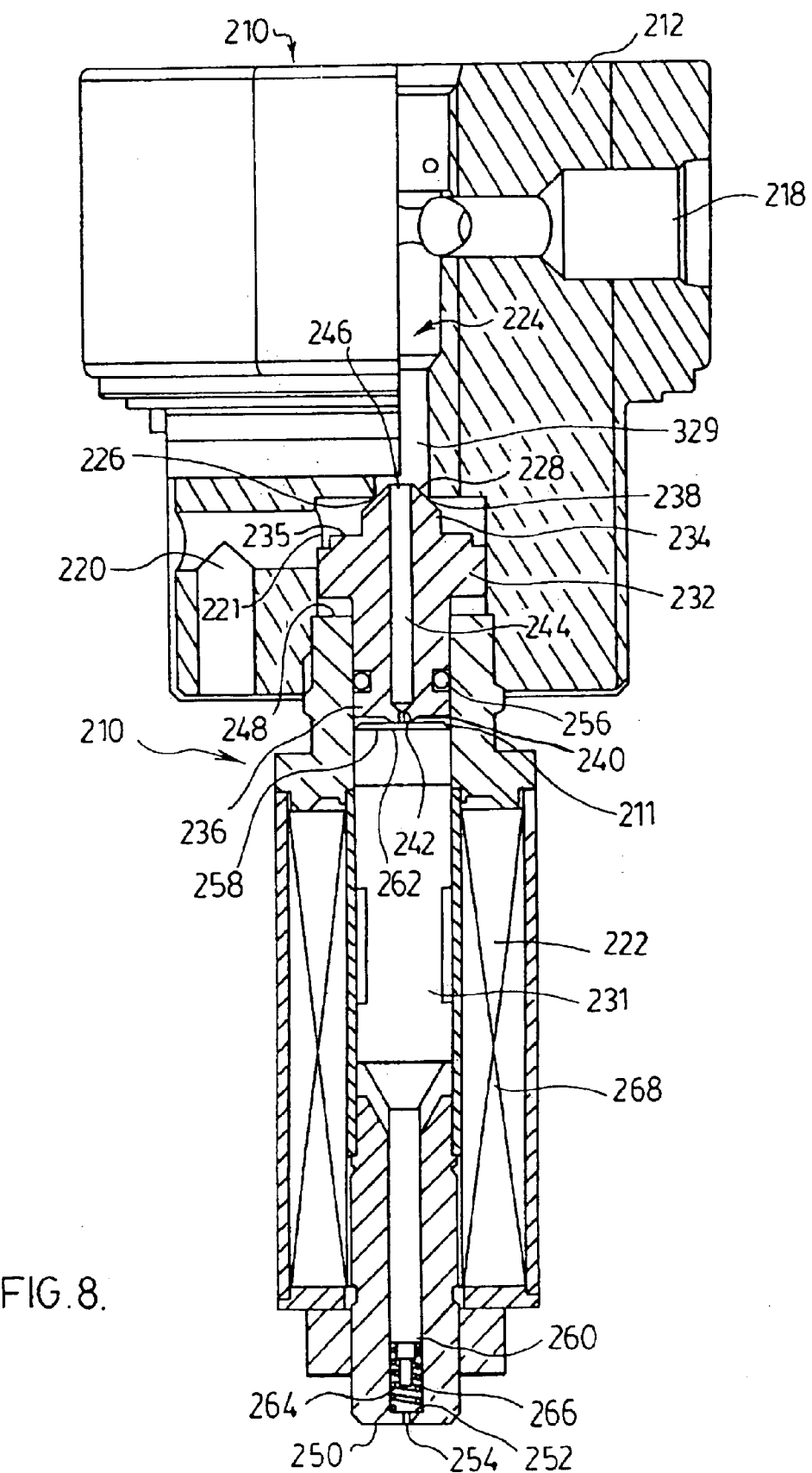
FIG. 8 is a cross-section of a solenoid valve assembly of the gas flow regulation module of FIG. 1, showing the solenoid valve in a closed position, drawn at a larger scale.
Figure 10:
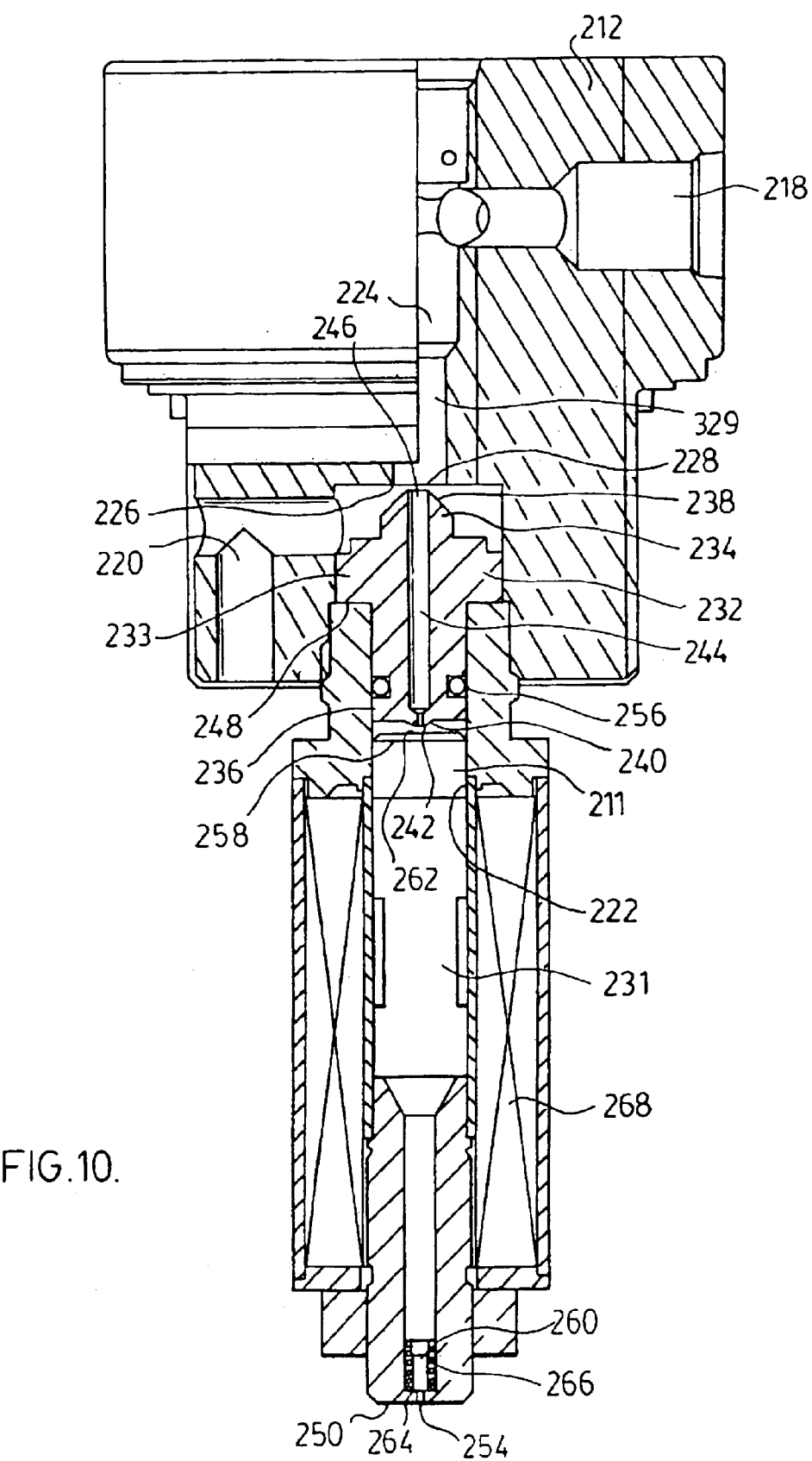
FIG. 10 is a cross-section of the solenoid valve assembly of FIG. 8, showing the solenoid valve in a open position.

As can be seen in FIGS. 8 and 10, the solenoid valve 230 includes a conduit 211. The conduit 211 includes a first conduit orifice 254, a second conduit orifice 221, and the orifice 228.

The conduit 211 includes a sleeve 222. A secondary piston 232 and a primary piston 231 are disposed and slidably carried within the sleeve 222, and are movable therein. The primary piston 231 is interposed between the secondary piston 232 and the first conduit orifice 254. The sleeve 222 includes a first end 248 and a second end 250. The second end 250 includes a valve seat 252 with an orifice 254 formed therein (FIG. 8). The sleeve 222 is in fluid communication with the interior space 219 via the orifice 254.

Figure 9:
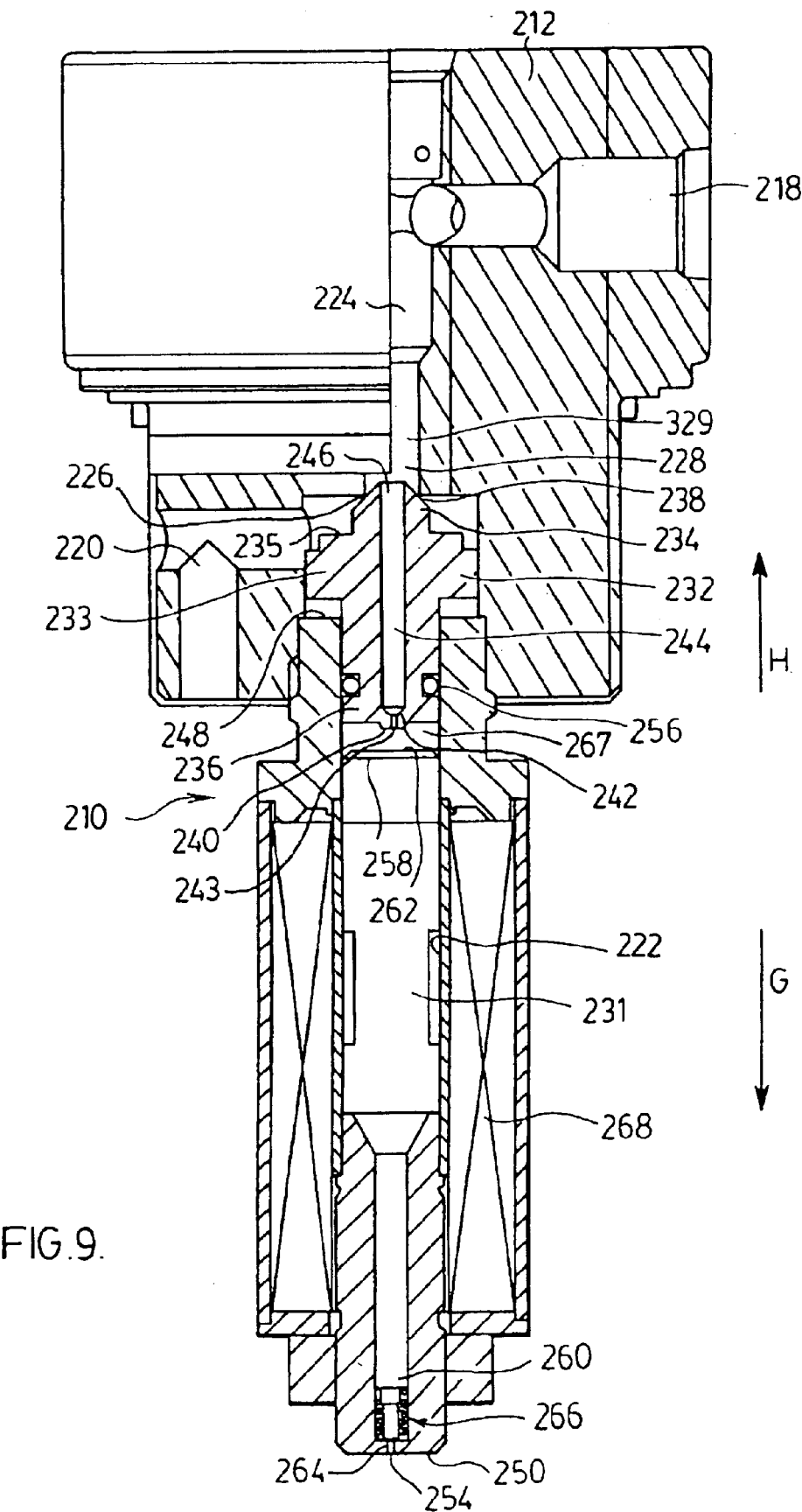
FIG. 9 is a cross-section of the solenoid valve assembly of FIG. 8, showing the solenoid valve in a transition position.

The secondary piston 232, which comprises non-magnetic material, includes a body 233 having a first end 234 and a second end 236. A bore, functioning as a bleed passage 244, is disposed within the body 233 and extends therethrough between a first aperture 246 at the first end 234 and a second aperture 242 at the second end 236. A second aperture 242 defines an orifice 243 (FIG. 9). The first aperture 246 opens into the flow passage 224. The second aperture 242, as well as the orifice 243, is in fluid communication with the flow passage 224 via the bleed passage 244. A sealing member 256, such as an O-ring, is carried at the periphery of the body 233, between the body 233 and the sleeve 222 of the conduit 211, thereby creating a seal to prevent gas from flowing between the orifice 254 and the first end 248 of the sleeve 222. Due to sealing member 256, the secondary piston 232 is sealingly engaged to the sleeve 222.

The first end 234 of the secondary piston 232 has a sealing surface 238 adapted for sealable engagement with the solenoid valve seat 226 for closing the orifice 228. The first end 234 is further characterized by a surface 235 which is exposed to pressure from the gas within the pressure vessel 216, via inlet port 220.

The second end 236 of the secondary piston 232 includes a valve seat 240. The orifice 243 is disposed in the valve seat 240 (FIG. 9).

As illustrated in FIGS. 8–11, each of the orifice 243 and the orifice 254 is characterized by a cross-sectional area smaller than that of the orifice 228. This facilitates faster unseating of the secondary piston 232 from the solenoid valve seat 226 and unsealing of the orifice 228, as will be described below.

In one embodiment, the orifice 243 is characterized by a smaller cross-sectional area than the orifice 254. This facilitates bleeding of gas from the sleeve 222 through the bleed passage 244, as will be hereinafter described.

The primary piston 231, which comprises magnetic material, includes a first end 258 and a second end 260 (FIG. 8). The first end 258 has a sealing surface 262 adapted for engagement with the valve seat 240 closing the orifice 243. The second end 262 has a second sealing surface 264 for engaging the valve seat 252, thereby closing the orifice 254 (FIG. 9). In the preferred embodiment, the spring 266 is housed at the second end 250 of the sleeve 222 and presses against the second end 260 of the primary piston 231. The biasing means or spring 266 bears against the primary piston 231 to bias the primary piston 231 towards the secondary piston 232, to press the first sealing surface 262 against the valve seat 240 and thereby close the orifice 243.

Surrounding a portion of the sleeve 222 in which the primary piston 231 is generally positioned is the solenoid coil 268. The solenoid coil 268 is provided to apply electromagnetic forces to the primary piston 231 upon external actuation thereof, i.e., to attract the primary piston 231 in the direction of arrow "G" (FIG. 9), thereby causing movement of the primary piston 231 in the direction of arrow "G" against the force exerted by the spring 266 and fluid pressure forces within the sleeve 222 in the direction of arrow "H" (FIG. 9).

FIGS. 8, 9, and 10 illustrate the instant-on valve assembly 210 in various conditions of operation. FIG. 8 illustrates the solenoid valve 230 in a closed position. In this condition, the solenoid coil 268 is not energized. Under these circumstances, the spring 266 biases the primary piston 231 towards the secondary piston 232, i.e., in the direction of arrow "H" (FIG. 9). Also, however, the second sealing surface 264 is spaced from the orifice 254 of the valve seat 252 in the sleeve 222, thereby opening the orifice 254 to gas pressure in the pressure vessel 216. Contemporaneously, the first sealing surface 262 on the primary piston 231 is pressed against the valve seat 240 on the secondary piston 232, thereby closing the orifice 243. Because the orifice 254 in the sleeve 222 is open to fluid pressure in the pressure vessel 216, the spaces between the sealing member 256 and the orifice 254 (i.e., between the sleeve 222 and the primary piston 231 and the second end 236 of the secondary piston 232, up to the seal 256) are also exposed to gas pressure of the pressure vessel 216.

Turning to the secondary piston 232, as shown in FIG. 8, the first end 234 thereof is exposed to gas pressure within the pressure vessel 216 via the inlet port 220. Such gas pressure, acting upon the secondary piston 232, is overcome by the combined action of the spring 266 and gas pressure within the sleeve 222 (up to the seal 256), the latter forces being translated to the secondary piston 232 by the primary piston 231. Accordingly, the sealing surface 238 on the secondary piston 232 is pressed against the solenoid valve seat 226, thereby closing the orifice 228.

FIG. 9 illustrates the solenoid valve 230 in a transition position, i.e., moments after the solenoid coil 268 is energized. Shortly after the solenoid coil 268 is energized, electromagnetic forces produced thereby act upon the primary piston 231 and overcome the forces exerted by the spring 266 and gas pressure within the sleeve 222 (up to the seal 256), thereby causing the primary piston 231 to move in the direction of arrow "G" in FIG. 9. Such movement of the primary piston 231 in turn causes the second sealing surface 264 in the primary piston 231 to engage with the valve seat 252, thereby closing the orifice 254. Simultaneously, the first sealing surface 262 on the primary piston 231 disengages from the valve seat 240 of the secondary piston 232, thereby opening up a gap 267 between the primary and secondary pistons 231, 232 thereby opening the orifice 243. Upon opening the orifice 243 in the secondary piston 232, gas between the sleeve 222 and the primary piston 231 and the second end 236 of the secondary piston 232 (up to the seal 256) at that time begins to escape via the orifice 243, through the bleed passage 244 and to flow out of the valve 230 into flow passage 224 toward the outlet port 218. As this happens, gas pressure within the sleeve 222 begins to drop. However, under these conditions (i.e., as shown in FIG. 9), gas pressure in the gap 267 has not dropped sufficiently to permit disengagement of the sealing surface 238 of the secondary piston 232 from the solenoid valve seat 226. This is because the gas pressure acting on the surface of the first end 234 of the secondary piston 232 is still insufficient to overcome gas pressure in the gap 267 urging the surface of the second end 236 of the secondary piston 232 in the direction of arrow "H" (FIG. 9).

FIG. 10 illustrates the solenoid valve 230 in an open position. In this condition, gas within the sleeve 222 between the sealing member 256 and the orifice 254 has further escaped through the bleed passage 244 (via the orifice 243) in the secondary piston 232. At this point, gas pressure acting in the gap 267 at the surface of the second end 236 (i.e., in the direction of arrow "H" in FIG. 9) has sufficiently subsided to become overcome by the gas pressure acting upon the surface of the first end 234 of the secondary piston 232 to urge the sealing surface 238 to disengage from the solenoid valve seat 226 (i.e., in the direction of arrow "G" in FIG. 9). As a result, the sealing surface 238 of the secondary piston 232 has become unseated from the solenoid valve seat 226, as shown in FIG. 10, thereby creating an uninterrupted flow path from the interior space 219 of the pressure vessel 216 through the inlet port 220, to the outlet port 218 via the fluid passage 224, and thereafter to the first stage regulator 10.

As shown in FIG. 13, other ports are provided in the head portion 4 to facilitate operation of the above-described components of module 2. A thermally actuated relief device 348 can be provided within a throughbore 352 to vent tank gases in the case of a fire, to prevent explosions. The throughbore 352 vents to the outlet connection 313.

FIG. 7 illustrates a port 354 which is provided with a passage 356 extending therefrom, adapted to function as a wire pass-through, thereby permitting electrical connection (not shown) of the solenoid valve assembly 210 exterior to the pressure vessel 216, for control of actuation of the coil 268.

In use, the gas flow regulation module 2 is inserted through the opening 227 and into the interior space 219. The neck 6 is sealably secured in the opening 227 by any suitable means. Electrical connections to the solenoid valve assembly 210 are effected via the passage 356, and the interior space 219 is filled with gas via the fill port 331, the fill passage, the bore, the first segment 225, and the inlet port 220. Subsequently, after the pressure vessel 216 has been filled with gas (as described), upon actuation of the solenoid coil 268, the solenoid valve 230 is opened as required to permit gas to exit from the interior space 219 via the gas regulation module 2. As described, the gas flows through the inlet port 220 into the flow passage 224, into the first stage regulator 10, then into the second stage regulator 110, finally to exit the gas flow regulation module 2 at the exit pressure via the outlet passage 300 and the exit port 310.

Because of the passages 13, 84 connecting the first stage and second stage regulators 10, 110, and also because the spring chamber 146 of the second stage regulator 110 vents to the atmosphere (i.e., via the passage 184 and the port 316), a failure of the first stage regulator 10 and a failure of the second stage regulator 110 would result in gas from the interior space 219 at high pressure flowing through the regulators 10, 110 and ultimately into the atmosphere. This dangerous situation is controllable in the preferred embodiment of the gas flow regulation module 2 because the valve seat 335 is upstream of the first stage regulator 10. In the event of failure of the first and second stage regulators, the user can stop the flow of gas through the flow passage 224 by manipulating the actuator 344 to move the valve stem 340 to the closed position. The first and second stage regulators 10, 110 can be isolated from the gas in the pressure vessel 216 by closing the manual valve 330.

In general, the diameter of a diaphragm in a pressure regulator should be as large as is feasible, because a larger diameter diaphragm will be relatively more sensitive to fluctuations in pressure acting on it than a smaller diameter diaphragm. As can be seen in FIGS. 1, 5, and 7, the preferred embodiment of the gas flow regulation module 2 provides for relatively larger diameter diaphragms in the first and second stage regulators 10, 110 while also providing (in the head 4, neck 6, and base 14 of the body portion 9) sufficient room to accommodate the bore 329, the manual shut-off valve 330, the outlet passage 300, and additional necessary elements of the module 2.

The opening 227 is defined by a central axis 62 (FIG. 1). As can be seen in FIGS. 1, 5, 6, and 7, when the module 2 is inserted through the opening 227, the diaphragms 52, 152 are required to be positioned substantially parallel to the central axis 62 of the opening 227. The opening 227 is substantially circular in plan view (not shown), and the maximum distance across the opening 227 is aligned with the axis 62, i.e., in the center of the opening 227. Because of this, the gas flow regulation module 2 is configured so that the diaphragms 52, 152 of the first and second stage regulators 10, 110 were substantially aligned with the central axis 62 when the body portion 9 was inserted into the interior space 219. Also, following insertion of the body portion 9 into the interior space 219, the diaphragms 52, 152 remain substantially aligned with the central axis 62. The configuration of the gas flow regulation module 2 also accommodates the passage 356 through the head and neck portions 4, 6, which permits electrical wiring (not shown) to extend through the passage 356 to the solenoid valve assembly 210.

It will be appreciated by those skilled in the art that gas within the pressure vessel 216 is generally maintained at a storage pressure of about 2,000 to about 5,000 psig. As gas flows across the first stage regulator 10, pressure is dropped to approximately 300 to 500 psig. Pressure is further reduced after the gas flows through the second stage regulator 110 to an exit pressure of approximately 20 to approximately 200 psig.

References to "gas" herein should be understood to be references to gaseous fuels and also mixtures of gases, as is known to those skilled in the art. For example, hydrogen and natural gas are sometimes mixed to form a gaseous fuel known as "hythane".

Those skilled in the art will appreciate that channels for the circulation of temperature-controlling fluid (not shown) may be required to be provided in the gas flow regulation module 2, depending on the type of gaseous fuel to be regulated by the module 2. For example, if the gaseous fuel is natural gas, then temperature-controlling fluid would preferably be circulated in the module 2 to heat the module 2 when it is in operation. The design of the module 2 of the present invention provides sufficient room in the base 14 and in the head and neck portions 4, 6 to accommodate suitable channels for the circulation of temperature-controlling fluid. For example, parts of such channels could be located in the base 14 generally between the bore 329 and the first and second stage regulators 10, 110.

It will be evident to those skilled in the art that the invention can take many forms, and that such forms are within the scope of the invention as claimed. Therefore, the spirit and scope of the appended claims should not be limited to the description of the preferred versions contained herein.

I claim:

1. A gas flow regulation module for use with a pressure vessel, the pressure vessel having a wall adapted to contain a gas under a storage pressure in an interior space defined by the wall and an opening in the wall, the opening having a minimum opening diameter, the gas flow regulation module having:

a head portion having an exterior side and an opposed interior side;

a neck portion extending from the interior side of the head portion to an inner end thereof, the neck portion being adapted to be sealably secured in the opening;

a body portion extending from the inner end of the neck portion such that, when the neck portion is secured in the opening, the body portion is positioned in the interior space;

the body portion having a maximum external diameter which is less than the minimum opening diameter, to permit the insertion of the body portion through the opening into the interior space;

the body portion having:

a base;

an inlet port in fluid communication with the interior space of the pressure vessel when the body portion is positioned in the interior space;

a flow passage extending from the inlet port to a first stage regulator;

a transfer passage in the base extending from the first stage regulator to a second stage regulator;

the flow passage including a valve seat positioned therein, between the first stage regulator and the inlet port;

the valve seat defining an orifice;

an outlet passage extending from the second stage regulator to an outlet port located in the head portion;

the first stage regulator and the second stage regulator being adapted to reduce pressure exerted by the gas flowing therethrough from the storage pressure to an exit pressure;

a bore extending from a manual shut-off valve port in the head portion and through the neck portion and the base to the flow passage, the bore being in fluid communication with the flow passage; and a manual shut-off valve including:
   a manual shut-off valve body sealably secured in the manual shut-off valve port;
   a valve stem extending in the bore from a proximal end thereof operatively connected to the manual shut-off valve body to a distal end;
   the distal end including an engagement portion with a sealing surface thereon, the sealing surface being adapted for sealable engagement with the valve seat to prevent gas flow through the orifice;
   the valve stem being movable between a closed position, in which the engagement portion engages the valve seat to seal the orifice and thereby prevent gas flow through the flow passage to the first stage regulator, and an open position, in which the engagement portion is disengaged from the valve seat such that the orifice is unobstructed, to permit gas to flow through the flow passage to the first stage regulator,
whereby the flow of gas through the gas regulation module is controllable by the manual shut-off valve.

2. A gas flow regulation module according to claim 1 in which the manual shut-off valve includes an actuator extending from the manual shut-off valve body and operably connected to the valve stem, for effecting movement of the valve stem between the open and closed positions.

3. A gas flow regulation module according to claim 1 in which the flow passage comprises a first segment extending from the inlet port to the orifice and a second segment extending from the orifice to the first stage regulator and the gas flow regulation module additionally includes:
   a fill port located in the head portion;
   a fill passage extending from the fill port to the bore, such that gas under a pressure exceeding the storage pressure is movable through the fill passage, to the bore and through the orifice to the first segment of the flow passage, and through the inlet port into the interior space.

4. A gas flow regulation module according to claim 1 in which the body portion additionally includes a solenoid valve assembly for controlling the flow of gas through the inlet port, the solenoid valve assembly including:
   a valve body adapted for attachment to the base, the valve body including the inlet port and a valve body segment of the flow passage extending from the inlet port to the valve seat;
   a solenoid valve seat located in the valve body segment defining an orifice; and
   a solenoid valve mounted to an inner end of the valve body, the solenoid valve including:
      a seal for engaging with the solenoid valve seat to sealably close the orifice;
      a biasing means to bias the seal towards the solenoid valve seat to close the orifice;
      a secondary piston connected to the seal; and
      a coil for causing movement of the secondary piston such that the seal disengages from the solenoid valve seat when the coil is actuated.

5. A gas flow regulation module according to claim 4 additionally including:
   a fill passage extending from the fill port to the bore adapted to permit gas under a fill pressure exceeding the storage pressure to pass through the bore to the orifice; and
   the solenoid valve being adapted to open upon gas at the fill pressure entering into the valve body segment of the flow passage pushing the seal open, thereby forcing the seal to disengage from the solenoid valve seat, such that gas under the fill pressure passes through the first segment and the inlet port and into the interior space.

6. A gas flow regulation module according to claim 5 additionally including a filter assembly positioned in the fill passage to filter incoming gas.

7. A gas flow regulation module according to claim 1 additionally including a pressure relief valve in fluid communication with the outlet passage and positioned to vent via a relief outlet connection positioned in the head portion.

8. A gas flow regulation system including:
   a pressure vessel, the pressure vessel having a wall adapted to contain a gas under a storage pressure in an interior space defined by the wall;
   the wall having an opening therein, the opening having a minimum opening diameter;
   a gas flow regulation module for use with the pressure vessel, the gas flow regulation module having:
      a head portion having an exterior side and an opposed interior side;
      a neck portion extending from the interior side of the head portion to an inner end thereof, the neck portion being adapted to be sealably secured in the opening;
      a body portion extending from the inner end of the neck portion such that, when the neck portion is secured in the opening, the body portion is positioned in the interior space;
      the body portion having a maximum external diameter which is less than the minimum opening diameter, to permit the insertion of the body portion through the opening into the interior space;
      the body portion having:
         a base;
         an inlet port in fluid communication with the interior space of the pressure vessel when the body portion is positioned in the interior space;
         a flow passage extending from the inlet port to a first stage regulator;
         a transfer passage in the base extending from the first stage regulator to a second stage regulator;
         the flow passage including a valve seat positioned therein, between the first stage regulator and the inlet port;
         the valve seat defining an orifice;
      an outlet passage extending from the second stage regulator to an outlet port located in the head portion;
      the first stage regulator and the second stage regulator being adapted to reduce pressure exerted by the gas flowing therethrough from the storage pressure to an exit pressure;
      a bore extending from a manual shut-off valve port in the head portion and through the neck portion and the base to the flow passage, the bore being in fluid communication with the flow passage; and
      a manual shut-off valve including:
         a manual shut-off valve body sealably secured in the manual shut-off valve port;
         a valve stem extending in the bore from a proximal end thereof operatively connected to the manual shut-off valve body to a distal end;
         the distal end including an engagement portion with a sealing surface thereon, the sealing surface being adapted for sealable engagement with the valve seat to prevent gas flow through the orifice;
         the valve stem being movable between a closed position, in which the engagement portion engages the valve seat to seal the orifice and thereby prevent gas flow through the flow passage to the first stage regulator, and an open position, in which the engagement portion is disengaged from the valve seat such that the orifice is unobstructed, to permit gas to flow through the flow passage to the first stage regulator, whereby the flow of gas through the gas regulation module is controllable by the manual shut-off valve.

9. A gas flow regulation system according to claim 8 in which the manual shut-off valve includes an actuator extending from the manual shut-off valve body and operably connected to the valve stem, for effecting movement of the valve stem between the open and closed positions.

10. A gas flow regulation system according to claim 8 in which the flow passage comprises a first segment extending from the inlet port to the orifice and a second segment extending from the orifice to the first stage regulator and the gas flow regulation module additionally includes:

a fill port located in the head portion;

a fill passage extending from the fill port to the bore, such that gas under a pressure exceeding the storage pressure is movable through the fill passage, to the bore and through the orifice to the first segment of the flow passage, and through the inlet port into the interior space.

11. A gas flow regulation system according to claim 8 in which the body portion additionally includes a solenoid valve assembly for controlling the flow of gas through the inlet port, the solenoid valve assembly including:

a valve body adapted for attachment to the base, the valve body including the inlet port and a valve body segment of the flow passage extending from the inlet port to the valve seat; and a solenoid valve seat located in the valve body segment defining an orifice; and a solenoid valve mounted to an inner end of the valve body, the solenoid valve including:

a seal for engaging with the solenoid valve seat to sealably close the orifice;

a biasing means to bias the seal towards the solenoid valve seat to close the orifice;

a secondary piston connected to the seal; and a coil for causing movement of the secondary piston such that the seal disengages from the solenoid valve seat when the coil is actuated.

12. A gas flow regulation system according to claim 11 additionally including:

a fill passage extending from the fill port to the bore adapted to permit gas under a fill pressure exceeding the storage pressure to pass through the bore to the orifice; and the solenoid valve being adapted to open upon gas at the fill pressure entering into the valve body segment of the flow passage pushing the seal open, thereby forcing the seal to disengage from the solenoid valve seat, such that gas under the fill pressure passes through the first segment and the inlet port and into the interior space.

13. A gas flow regulation system according to claim 12 additionally including a filter assembly positioned in the fill passage to filter incoming gas.

14. A gas flow regulation system according to claim 8 additionally including a pressure relief valve in fluid communication with the outlet passage and positioned to vent via a relief outlet connection positioned in the head portion.

* * * * *